US012769036B2

(12) United States Patent
Koga

(10) Patent No.: US 12,769,036 B2
(45) Date of Patent: Oct. 20, 2026

(54) OPTICAL ELEMENT, OPTICAL APPARATUS, AND METHOD FOR MANUFACTURING OPTICAL ELEMENT

(71) Applicant: CANON KABUSHIKI KAISHA, Tokyo (JP)

(72) Inventor: Kazuhiro Koga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 18/438,990

(22) Filed: Feb. 12, 2024

(65) Prior Publication Data

US 2024/0288613 A1 Aug. 29, 2024

(30) Foreign Application Priority Data

Feb. 27, 2023 (JP) ................................ 2023-028687

(51) Int. Cl.
*G02B 5/00* (2006.01)

(52) U.S. Cl.
CPC ..................................... *G02B 5/00* (2013.01)

(58) Field of Classification Search
None
See application file for complete search history.

(56) References Cited

U.S. PATENT DOCUMENTS

2005/0219353 A1* 10/2005 Matsuo .................. G02B 1/118 347/258
2010/0055397 A1* 3/2010 Kurihara ................. B29C 33/42 428/141
2015/0062712 A1* 3/2015 Tazawa ................ G02B 5/0215 118/620

FOREIGN PATENT DOCUMENTS

JP 2004361906 A 12/2004
JP 2007171857 A 7/2007
JP 2011013562 A 1/2011
JP 2012093683 A 5/2012

* cited by examiner

*Primary Examiner* — Robert E. Tallman
(74) *Attorney, Agent, or Firm* — Canon U.S.A., Inc., IP Division

(57) ABSTRACT

An optical element includes an uneven structure having a plurality of convex portions on at least part of an optical surface, including a first convex portion and a second convex portion arranged closer to an optical surface center than the first convex portion. A first convex portion shape as viewed from a first convex portion normal direction has a length $r_1$ in a first direction from the optical surface center toward an optical surface end and a length $r_2$ in a second direction intersecting the first direction. A second convex portion shape as viewed from a second convex portion normal direction has a length $r_3$ in a third direction from the optical surface center toward the optical surface end and a length $r_4$ in a fourth direction intersecting the third direction. The following relationships are satisfied: $r_1>r_2$, $r_3 \geq r_4$, $r_1>r_3$, and $r_2<r_4$.

16 Claims, 13 Drawing Sheets

OPTICAL ELEMENT, OPTICAL APPARATUS, AND METHOD FOR MANUFACTURING OPTICAL ELEMENT

BACKGROUND

Field

The present disclosure relates to an optical element, an optical apparatus, and a method for manufacturing an optical element.

Description of the Related Art

In an optical system including an optical element, reflection of incident light on a surface and an inner surface of the optical element is not desirable because it causes a loss of transmitted light amount, a reflection ghost, and the like. Accordingly, it is known to suppress the reflection of incident light on the surface and the inner surface of the optical element by forming an antireflection film on the surface of the optical element or forming an uneven structure on the surface of the optical element.

For example, Japanese Patent Application Laid-Open No. 2012-93683 discusses a mode in which the orientations of fine protrusion-depression shapes of a light diffusion member coincide with the mold release direction of a mold.

In the mode discussed in Japanese Patent Application Laid-Open No. 2012-93683, the antireflection performance is reduced for obliquely incident light as compared with light vertically incident on an optical surface, and there is a concern that the antireflection performance on the optical surface may vary.

SUMMARY

The disclosed optical element works to suppress variation in antireflection performance on an optical surface.

According to an aspect of the present disclosure, an optical element includes an uneven structure including a plurality of convex portions on at least part of an optical surface, wherein the plurality of convex portions includes a first convex portion and a second convex portion arranged closer to a center of the optical surface than the first convex portion, wherein a shape of the first convex portion as viewed from a normal direction of the first convex portion has a length $r_1$ in a first direction from the center of the optical surface toward an end of the optical surface and a length $r_2$ in a second direction intersecting the first direction, wherein a shape of the second convex portion as viewed from a normal direction of the second convex portion has a length $r_3$ in a third direction from the center of the optical surface toward the end of the optical surface and a length $r_4$ in a fourth direction intersecting the third direction, and wherein the following relationships are satisfied $r_1>r_2$, $r_3\geq r_4$, $r_1>r_3$, and $r_2<r_4$.

Further features of the present disclosure will become apparent from the following description of exemplary embodiments with reference to the attached drawings.

DESCRIPTION OF THE EMBODIMENTS

Figure 1A:
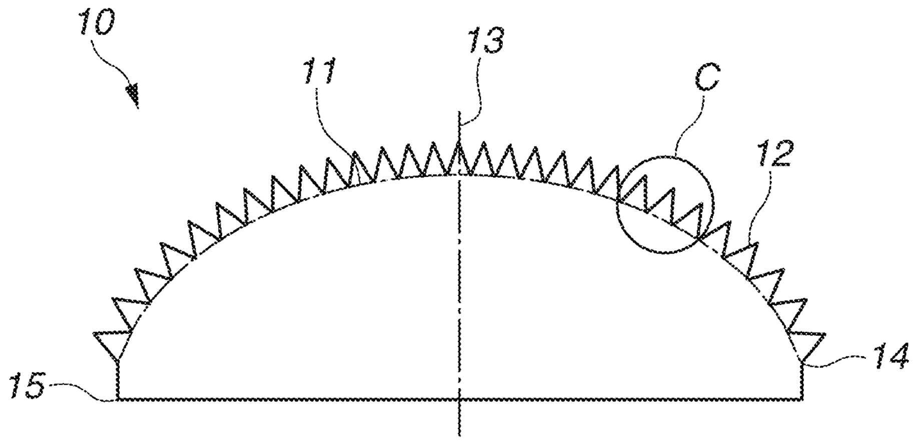
FIG. 1A is a side sectional view of an optical element according to an exemplary embodiment.

Hereinafter, exemplary embodiments for carrying out the present disclosure will be described with reference to the drawings. However, each mode described below is one exemplary embodiment of the disclosure, and the disclosure is not limited to this. The common configurations will be described with reference to the plurality of drawings, and the description of the configurations denoted by the common reference numerals will be appropriately omitted. Different items having the same name can be distinguished by adding an ordinal number such as a first item and a second item.

FIG. 1A is a side sectional view of an optical element 10 according to a first exemplary embodiment. The optical element 10 includes an optical surface 11, an uneven structure 12 including a plurality of convex portions provided on a surface of the optical surface 11, and an edge portion 15. In the present exemplary embodiment, an example in which the optical element 10 is a lens is shown, the optical surface 11 is a curved surface, and the outer edge of the optical surface has a circular shape. FIG. 1A shows a cross section along a direction from a center 13 of the optical surface 11 passing through the optical axis of the lens toward an end 14. In the present exemplary embodiment, the direction from the center 13 toward the end 14 corresponds to a radial direction of the circular optical surface, and the direction orthogonal to the radial direction and going around the optical element 10 corresponds to a circumferential direction. In the following description, the terms "radial direction" and "circumferential direction" will be used.

In the present exemplary embodiment, the optical element 10 has an anti-reflection function by providing the optical surface 11 with the uneven structure 12. The uneven structure 12 may be provided on the entire optical surface 11 or may be provided on a part of the optical surface 11. In the present exemplary embodiment, the uneven structure 12 is provided by forming a plurality of convex portions on the optical surface 11, but the uneven structure may be provided by forming a plurality of concave portions on the optical surface 11 instead of the plurality of convex portions. Here, the plurality of convex portions are portions protruding from the optical surface 11, and the plurality of concave portions are portions depressed from the optical surface 11. The uneven structure 12 may have a plurality of convex portions or a plurality of concave portions formed on the entire surface of the optical surface 11. Further, a plurality of convex portions may be formed in the vicinity of the center 13 and a plurality of concave portions may be formed in the vicinity of the end 14, or conversely, a plurality of concave portions may be formed in the vicinity of the center 13 and a plurality of convex portions may be formed in the vicinity of the end 14. The plurality of convex portions and the plurality of concave portions may be formed at random.

Figure 1B:
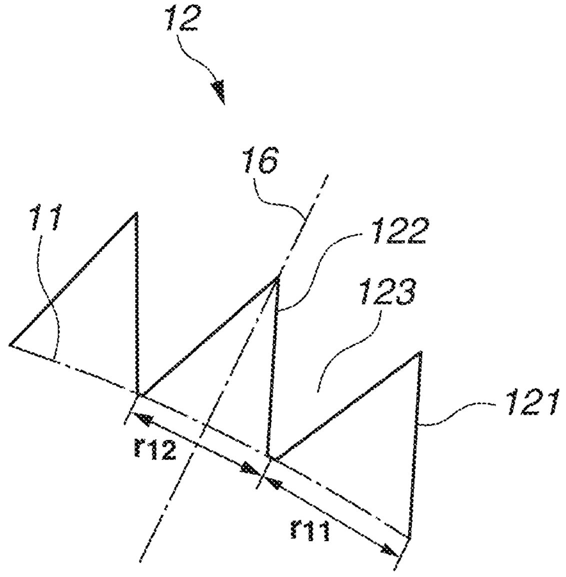
FIG. 1B is an enlarged view of a portion surrounded by a circle C in FIG. 1A.

FIG. 1B is an enlarged view of the portion of FIG. 1A surrounded by a circle C. The uneven structure 12 includes a convex portion 121 provided on the optical surface 11, a convex portion 122 adjacent to the convex portion 121, and a concave portion 123 corresponding to a portion between the convex portion 121 and the convex portion 122. A normal line 16 is a normal line of the optical surface 11. The uneven structure 12 is formed such that, when the uneven structure 12 is viewed in a radial cross section, a length $r_{12}$ of the bottom surface of the convex portion 122 arranged at a position closer to the center 13 of the optical surface 11 than the convex portion 121 is shorter than a length $r_{11}$ of the bottom surface of the convex portion 121. Here, the lengths $r_{11}$ and $r_{12}$ are lengths of the bottom surfaces of the respective convex portions along the radial direction (direction from the center 13 of the optical surface 11 toward the end 14). With this configuration, the refractive index can be gently changed even for light obliquely incident on the optical element 10, and the variation in the reflection performance between the vicinity of the center 13 and the vicinity of the end 14 can be suppressed.

In the present exemplary embodiment, the example in which the lengths of the bottom surfaces along the radial direction are different from each other in the convex portions adjacent to each other in the radial direction is described, but the lengths of the bottom surfaces along the radial direction of all the convex portions do not need to be different from each other. For example, the optical surface 11 may be divided into a plurality of concentric areas with respect to the center 13, and a plurality of convex portions having the same length of the bottom surface along the radial direction may be provided in each area. In this case, the convex portions are provided in such a manner that a length of the bottom surface of the convex portion, along the radial direction, formed in an area arranged closer to the center 13 than the convex portion formed in a certain area is shorter than a length of the bottom surface of the convex portion, along the radial direction, formed in the certain area.

In addition, in the present exemplary embodiment, the uneven structure 12 is provided by forming a plurality of convex portions on the optical surface 11, but as described above, the uneven structure may be formed by forming a plurality of concave portions on the optical surface 11. In this case, the shape of the opening of the concave portion corresponds to the shape of the bottom surface of the convex portion. That is, a length of the opening of the concave portion, along the radial direction, arranged closer to the center 13 than a certain concave portion is formed to be shorter than the opening of the certain concave portion along the radial direction. Further, even when the uneven structure is formed of a plurality of concave portions, the length of the opening along the radial direction of the concave portion may be different for each area, as in the case of the convex portion described above.

Figure 2A:
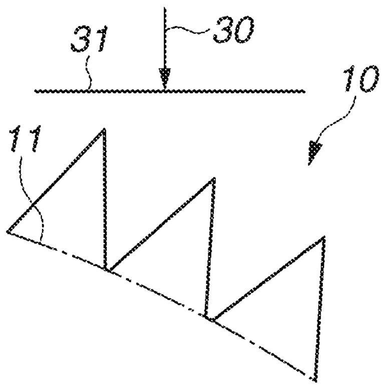
FIG. 2A is a view illustrating a state before light reaches the optical element.
Figure 2B:
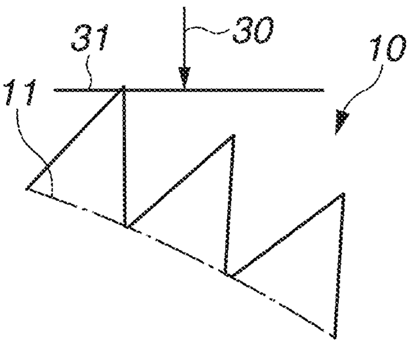
FIG. 2B is a view illustrating a state when light reaches the optical element.

Now, the reason why the refractive index can be made gentle with respect to light obliquely incident on the optical element 10 will be described with reference to FIGS. 2A and 2B. In general, when light enters a medium B from a medium A, the reflectance of the optical surface 11 changes due to the difference in refractive index between the medium A and the medium B. Here, it is assumed that a light 30 is incident on the optical surface 11 at a surface 31 as shown in FIGS. 2A and 2B. FIG. 2A is a view illustrating a state before the light 30 reaches the optical element 10, and FIG. 2B is a view illustrating a state when the light 30 reaches the optical element 10. At the stage of FIG. 2A, the light 30 exists in the air (corresponding to the medium A), and at the stage of FIG. 2B, the light 30 reaches the optical element 10 (corresponding to the medium B). Since the refractive index for the light 30 is determined by the average refractive index of the surface 31, the refractive index in the stage of FIG. 2B is different from that in the stage of FIG. 2A. After reaching the optical element 10, when the light 30 further enters the optical element 10, the refractive index with respect to the light 30 gradually changes to the refractive index of the optical element 10. Therefore, as the incident angle of the light 30 with respect to the optical surface 11 increases, the length of the bottom surface of the convex portion along the radial direction is increased, and thus the refractive index of the convex portion can be gradually changed, and the reflectance can be reduced.

In the uneven structure 12 of the present exemplary embodiment, the distance between adjacent convex portions among the plurality of convex portions is preferably shorter than the wavelength of light incident on the optical surface 11. For example, in a case where the optical element 10 is used in an imaging optical system, the object of antireflection is visible light. In this case, the target wavelengths are preferably 400 nanometers (nm) or more and 780 nm or less, and the distances between the adjacent convex portions are preferably 380 nm or less. In addition, it is desirable that the length of the bottom surface along the radial direction of each convex portion constituting the uneven structure 12 is also shorter than the wavelength of light incident on the optical surface 11. For example, in the example shown in FIG. 1B, both of the lengths $r_{11}$ and $r_{12}$ are preferably shorter than the wavelengths of the light incident on the optical surface 11. That is, in a case where the light incident on the optical surface 11 is visible light, the lengths $r_{11}$ and $r_{12}$ are desirably equal to or less than 380 nm.

The length relationships described above are also true when the uneven structure is formed by forming a plurality of concave portions in the optical surface. In this case, the distance between the adjacent concave portions among the plurality of concave portions is formed to be shorter than the wavelength of light incident on the optical surface. Further, it is desirable that the length of the opening along the radial direction of each concave portion constituting the uneven structure is also formed to be shorter than the wavelength of light incident on the optical surface.

Figure 3:
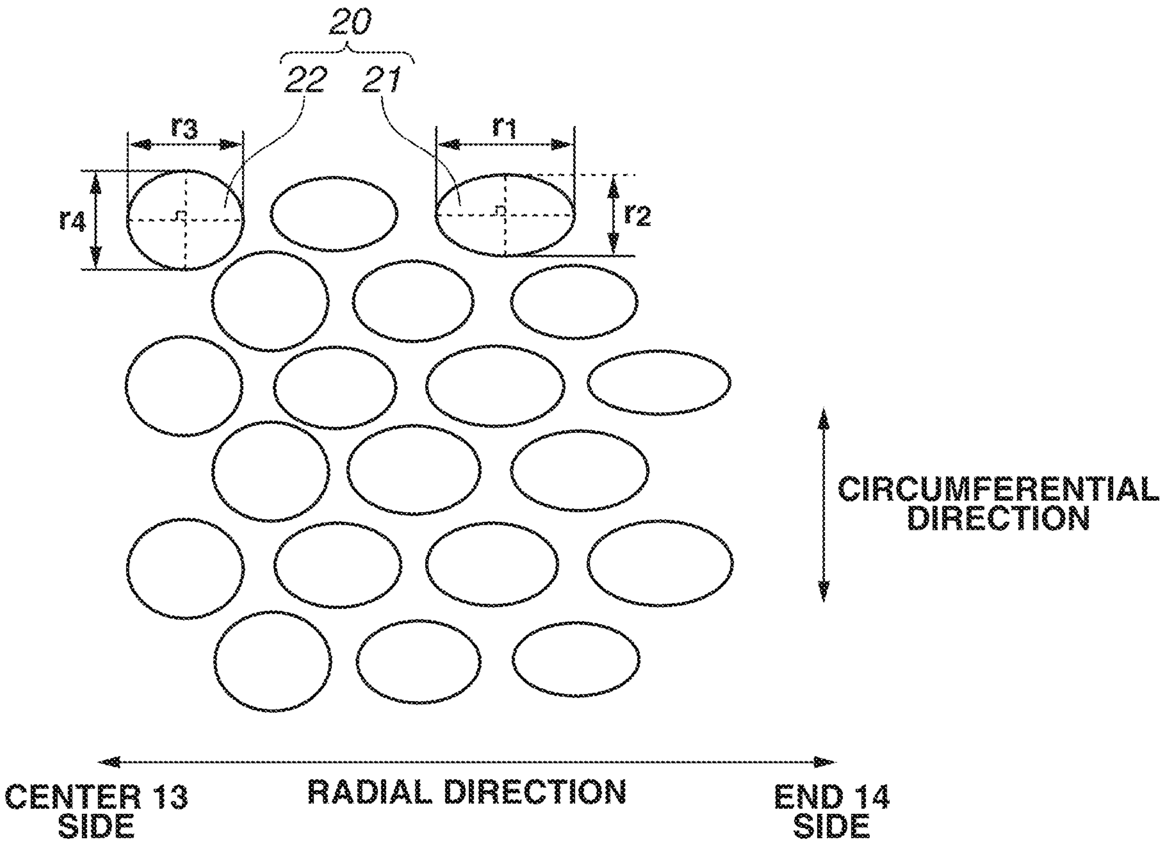
FIG. 3 is a view illustrating the optical element of the present exemplary embodiment as viewed from a direction perpendicular to an optical surface, that is, from a normal direction.

FIG. 3 is a view illustrating the optical element 10 of the present exemplary embodiment as viewed from a direction perpendicular to the optical surface 11, i.e., from the normal direction (see FIG. 1A). FIG. 3 illustrates the respective convex portions provided on the optical surface 11 as viewed from the respective normal directions, and is not a view as viewed from a certain normal direction. As shown in FIG. 3, the uneven structure 12 is composed of a plurality of convex portions having a circular or elliptical shape when viewed from the normal direction of the optical surface. Here, the shape of the convex portion as viewed from the normal direction of the optical surface (hereinafter, simply referred to as the shape of the convex portion) can be considered as the shape of the bottom surface of each convex portion along the optical surface as described above. This shape can also be expressed as the shape of a projection image obtained by projecting each convex portion onto the optical surface in the normal direction. In a case where the uneven structure is provided by forming a plurality of concave portions on the optical surface, the circular or elliptical shape as shown in FIG. 3 is a shape of each concave portion as viewed from the normal direction of the optical surface. In this case, these shapes can be considered as the shapes of the openings along the optical surfaces of the respective concave portions. Further, it can be expressed as the shape of a projection image obtained by projecting each concave portion onto the optical surface in the normal direction.

The uneven structure 12 shown in FIG. 3 has a plurality of convex portions 20. The plurality of convex portions 20 includes a first convex portion 21 and a second convex portion 22 arranged closer to the center 13 of the optical surface 11 than the first convex portion 21 (see FIG. 1A). The first convex portion 21 is shaped such that a length $r_1$ along a first direction from the center of the optical surface toward the end is longer than a length $r_2$ along a direction intersecting the first direction from the center of the optical surface toward the end. Here, the length $r_1$ is preferably longer than 1.0 times the length $r_2$ and equal to or shorter than 1.4 times the length $r_2$. That is, the ratio $r_1/r_2$ of the lengths $r_1$ and $r_2$ preferably satisfies the relationship $1.0<r_1/r_2\leq1.4$. That is, the shape of the first convex portion 21 is preferably an elliptical shape instead of a true circle. Although the first convex portion 21 is elliptical in this exemplary embodiment, the first convex portion 21 may be rectangular or the like having corners. In this case, too, a rectangular shape is preferred instead of a square shape, in accordance with the above-described definition of the lengths $r_1$ and $r_2$. If the ratio $r_1/r_2$ is too large, the change in the refractive index is greatly affected, and the antireflection performance may be impaired. In the present exemplary embodiment, since the outer edge of the optical surface is circular, the direction from the center of the optical surface toward the end can be rephrased as the radial direction of the circle, and the direction intersecting the radial direction (the direction orthogonal to the radial direction in the present exemplary embodiment) can be rephrased as the circumferential direction of the circle.

On the other hand, the second convex portion 22 is shaped such that a length $r_3$ along the radial direction (a second direction from the center of the optical surface toward the end) is equal to or longer than a length $r_4$ along the circumferential direction (direction intersecting the radial direction, which is a direction orthogonal to the radial direction in the present exemplary embodiment). Unlike the shape of the first convex portion 21, the shape of the second convex portion 22 may be such that the lengths $r_3$ and $r_4$ are equal to each other. That is, the shape of the second convex portion 22 may be a true circle, a square, or the like. Further, both the first convex portion 21 and the second convex portion 22 may have an elliptical shape. That is, in a case where the first convex portion 21 and the second convex portion 22 are circular, the shape of the first convex portion 21 has a higher oblateness.

In the present exemplary embodiment, the length $r_3$ of the shape of the second convex portion 22 along the radial direction is shorter than the length $r_1$ of the shape of the first convex portion 21 along the radial direction. On the other hand, the second convex portion 22 is formed such that the length $r_4$ of the second convex portion 22 along the circumferential direction (direction intersecting the radial direction) is longer than the length $r_2$ of the first convex portion 21 along the circumferential direction.

The above length relationships are expressed in terms of inequalities as follows:

$$r_1>r_2 \quad (1),$$

$$r_3\geq r_4 \quad (2),$$

$$r_1>r_3 \quad (3), \text{ and}$$

$$r_2<r_4 \quad (4).$$

By satisfying the relationships of the inequalities (1) to (4), the difference between the area of the bottom surface of the first convex portion 21 and the area of the bottom surface of the second convex portion 22 can be reduced. By reducing the difference between these areas, it is possible to suppress the variation in the antireflection performance between the portion where the first convex portion 21 is provided and the portion where the second convex portion 22 is provided on the optical surface.

Although the two convex portions, the first convex portion 21 and the second convex portion 22, are compared here, one of the first convex portion 21 and the second convex portion 22 may be a concave portion.

In the plurality of convex portions 20 including the first convex portion 21 and the second convex portion 22, the area of the bottom surface of each convex portion does not need to be the same. However, it is preferable that the area of the bottom surface of the convex portion having the largest area of the bottom surface among the plurality of convex portions is 1.0 times or more and 1.4 times or less the area of the bottom surface of the convex portion having the smallest area of the bottom surface. With such a configuration, the space occupancy per unit area of the plurality of convex portions on the optical surface 11 can be made constant, and the in-plane variation of the antireflection performance on the optical surface 11 can be reduced. When the object of antireflection is visible light, it is preferable that all of the lengths $r_1$, $r_2$, $r_3$ and $r_4$ are less than 380 nm.

Figure 4A:
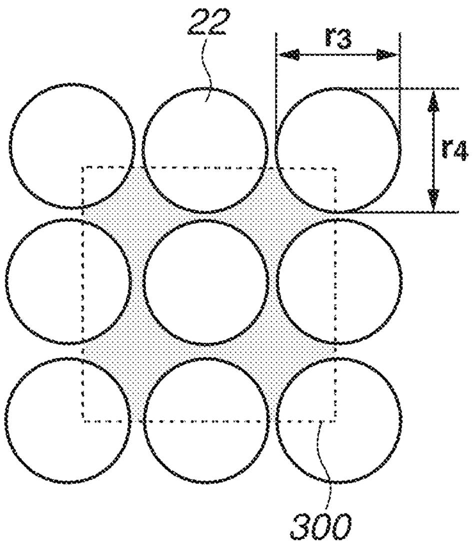
FIG. 4A is a view illustrating a plurality of convex portions around a second convex portion as viewed from the normal direction of the optical surface.
Figure 4B:
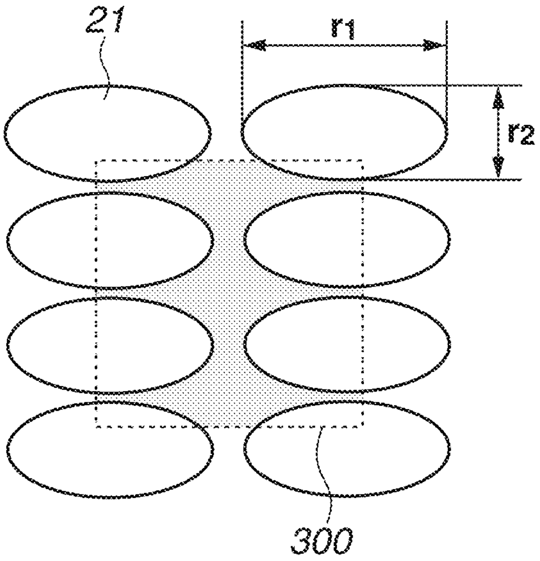
FIG. 4B is a view illustrating a plurality of convex portions around a first convex portion as viewed from the normal direction of the optical surface.

The reason why the in-plane variation of the antireflection performance of the optical surface 11 can be reduced will be described in detail with reference to FIGS. 4A and 4B. FIG. 4A is a view illustrating a plurality of convex portions around the second convex portion 22 as viewed from the normal direction of the optical surface, and FIG. 4B is a view illustrating a plurality of convex portions around the first convex portion 21 as viewed from the normal direction of the optical surface. A range 300 is drawn to show a unit area, and the areas are the same in FIG. 4A and FIG. 4B. In order to reduce the variation in the antireflection performance, it is preferable that the total area of the bottom surfaces of the convex portions 20 included in the range 300 has a small variation between the vicinity of the center 13 and the vicinity of the end 14. That is, it is preferable that the variation in the space occupancy of the bottom surface of the convex portion per unit area in the optical surface 11 is small. In the present exemplary embodiment, by forming the respective convex portions so as to satisfy the relationships of $r_1>r_3$ and $r_2<r_4$, the difference in the space occupancy rate is reduced as shown in FIGS. 4A and 4B, and the in-plane variation in the antireflection performance on the optical surface 11 can be reduced.

The reason why the configuration of the present exemplary embodiment can achieve antireflection will be described below. Light reflection occurs when light passes through an interface between media having different refractive indices. Here, by forming a fine uneven structure such as the uneven structure 12 of the present exemplary embodiment on the surface of the medium, the refractive index of the interface of the medium can be gradually changed. As a result, the difference in refractive index at the interface between the media is reduced, and the reflectance can be reduced. For example, in a case where the distance between the convex portions or the concave portions adjacent to each other in the uneven structure 12 (which may be referred to as a pitch when the distance is constant) is shorter than the wavelength of light incident on the optical surface, a higher antireflection effect can be exhibited. The distance between the adjacent convex portions or concave portions may be gradually increased from the center 13 toward the end 14. Further, the distance (interval) between the bottom surfaces of the convex portions adjacent to each other or the distance (interval) between the openings of the concave portions adjacent to each other may be gradually increased from the center 13 toward the end 14.

A conventional optical element is configured to smoothly change a refractive index with respect to light vertically incident on an uneven structure provided on an optical surface and to exhibit good antireflection performance. However, the refractive index changes roughly with respect to light obliquely incident on the uneven structure, and the antireflection performance for oblique incidence is reduced as compared with that for perpendicular incidence. Therefore, as in the present exemplary embodiment, by forming the uneven structure 12 such that the length of the shape of the convex portion 20 along the radial direction gradually increases from the center 13 toward the end 14, the refractive index with respect to the obliquely incident light can be gradually changed, and the antireflection performance with respect to the obliquely incident light is improved. In addition, by gradually reducing the length of the shape of the convex portion 20 along the circumferential direction from the center 13 toward the end 14, it is possible to suppress a change in the space occupancy of the convex portion with respect to the unit area of the optical surface and to reduce the in-plane variation of the antireflection performance in the optical surface 11.

In the present exemplary embodiment, the plurality of convex portions is configured such that the length in the radial direction gradually increases and the length in the circumferential direction gradually decreases from the center 13 of the optical surface 11 toward the end 14.

However, as described with reference to FIG. 1, the optical surface 11 may be divided into a plurality of concentric areas with respect to the center 13, and a plurality of convex portions having the same length along the radial direction of the shape of the convex portion may be provided in each area. In this case, the convex portions are provided so that the lengths of the convex portions, along the radial direction, formed in an area arranged closer to the center 13 than a certain area are shorter than the lengths of the convex portions formed in the certain area along the radial direction. Further, the convex portions are provided so that the lengths of the convex portions, in the circumferential direction, formed in an area arranged closer to the center 13 than a certain area are longer than the lengths of the convex portions formed in the certain area along the circumferential direction.

In the present exemplary embodiment, the plurality of convex portions is arranged in a staggered pattern (honeycomb arrangement) as shown in FIG. 3, but an arbitrary arrangement such as an orthogonal lattice arrangement (matrix arrangement) shown in FIGS. 4A and 4B can be selected.

In addition, in the present exemplary embodiment, the uneven structure having a plurality of convex portions has been described, but as described above, the uneven structure may be provided by forming a plurality of concave portions on the optical surface. Here, by replacing the "convex portion" with the "concave portion" and the "bottom surface of the convex portion" with the "opening of the concave portion", the entire description of the present exemplary embodiment can be applied to the case where the uneven structure is formed by a plurality of concave portions.

Figure 12A:
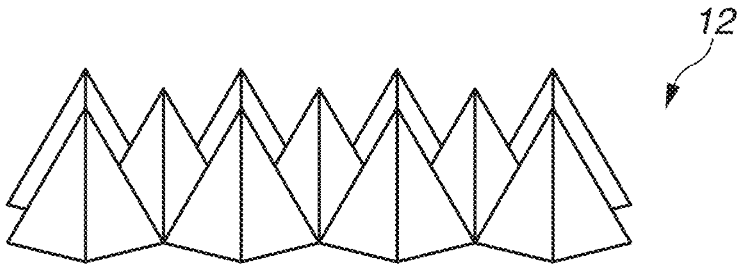
FIGS. 12A to 12D are diagrams each illustrating a modification of the first convex portion and the second convex portion.
Figure 12B:
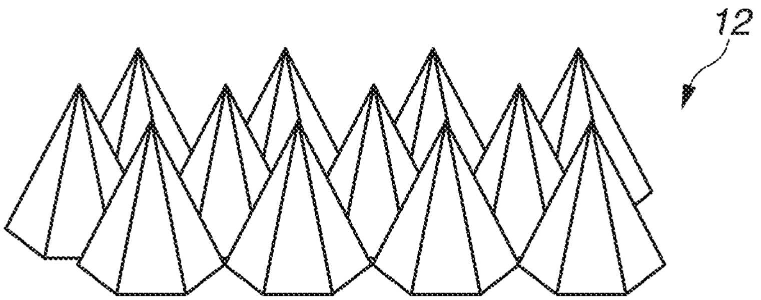
Figure 12C:
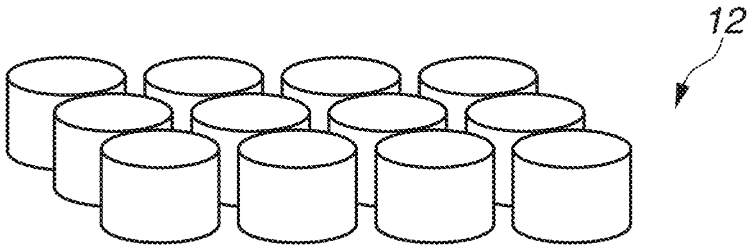
Figure 12D:
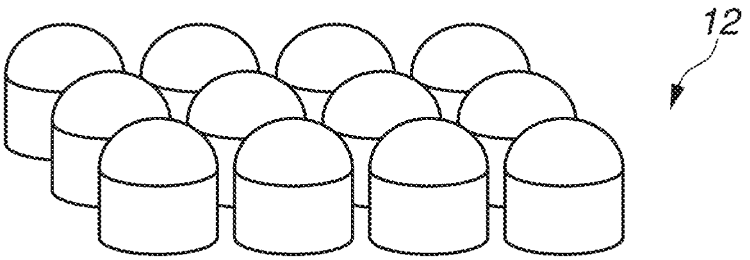

In the present exemplary embodiment, each of the plurality of convex portions constituting the uneven structure 12 has a conical shape or an elliptical cone shape, but may have another shape. For example, as shown in FIG. 12A, each convex portion of the uneven structure 12 may have a quadrangular pyramid shape. Similarly, each convex portion of the uneven structure 12 may have a polygonal pyramid shape shown in FIG. 12B, a cylindrical shape shown in FIG. 12C, or a shape in which a dome-shaped protrusion is placed on a cylinder as shown in FIG. 12D. Further, each convex portion of the uneven structure 12 may be formed in a dome shape as in the exemplary embodiment described later. In addition, in the case where the uneven structure is formed by a plurality of concave portions, the concave portions can be provided so that the space formed between each concave portion and the optical surface has the shape described above.

Figure 5A:
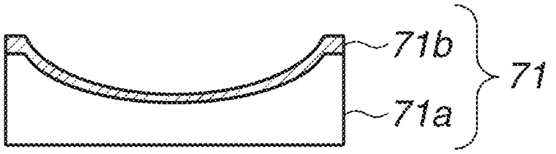
FIGS. 5A to 5F are diagrams illustrating a method for manufacturing the optical element.
Figure 5B:
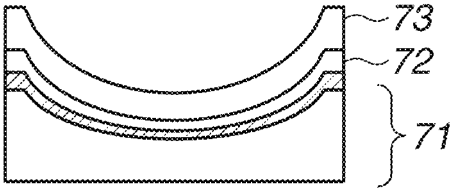

A method for manufacturing the optical element 10 according to the present exemplary embodiment will be described with reference to FIGS. 5A to 5F. First, a mold 71 for injection-molding shown in FIG. 5A is prepared. The mold 71 includes, for example, a stainless base portion 71*a* and a nickel-alloy mirror surface portion 71*b*. Next, a titanium film 72 and a silica dioxide film 73 shown in FIG. 5B are formed on the mold 71. As a film forming method, for example, a sputtering method is preferable, but any film forming method can be applied. The thickness of the titanium film 72 is preferably about 25 nm or more and 100 nm or less, and the thickness of the silica dioxide film 73 is preferably 200 nm or more and 400 nm or less.

Figure 5C:
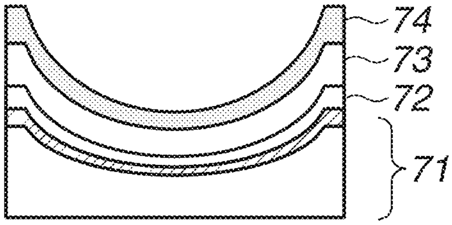
Figure 5D:
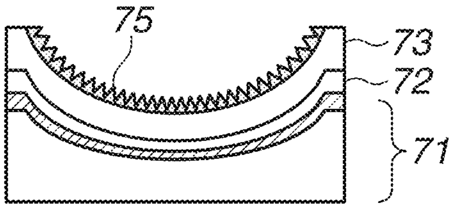
Figure 5E:
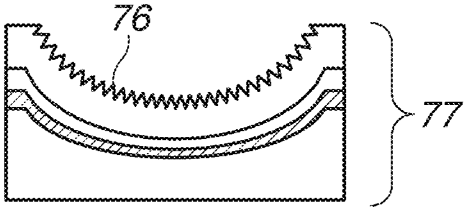

Subsequently, a photoresist layer 74 shown in FIG. 5C is formed by, for example, a spin coating method. Next, in FIG. 5D, the photoresist layer 74 is exposed by an ion beam drawing method and then developed, thereby obtaining a photoresist pattern 75. Subsequently, in FIG. 5E, the shape of the photoresist pattern 75 is copied to the silica dioxide film 73 by dry etching using $CHF_3$ gas, thereby forming an inverted structure 76 corresponding to the uneven structure 12. Then, after the photoresist on the surface of the inverted structure 76 is removed by an oxygen ashing method, a monomolecular mold release film (not shown) is formed on the surface of the inverted structure 76, thereby manufacturing a mold 77.

Figure 5F:
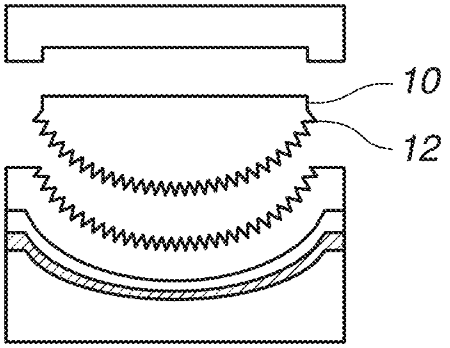

Thereafter, as illustrated in FIG. 5F, a cavity is formed using the mold 77 in which the inverted structure 76 is formed. The optical element 10 in which the uneven structure 12 is provided can be prepared by injecting resin into this cavity. The resin used for injection molding may be any material that has a transmittance of 90% or more at the wavelength of light used and can be injection-molded. In the visible light wavelength region, for example, cycloolefin polymer resin (COP), polystyrene resin (PS), acrylic resin such as polymethyl methacrylate resin (PMMA), polycarbonate resin (PC), or the like can be used.

Next, the present disclosure will be described in more detail with reference to Examples and Comparative Examples, but the present disclosure is not limited to the following Examples.

Figure 6:
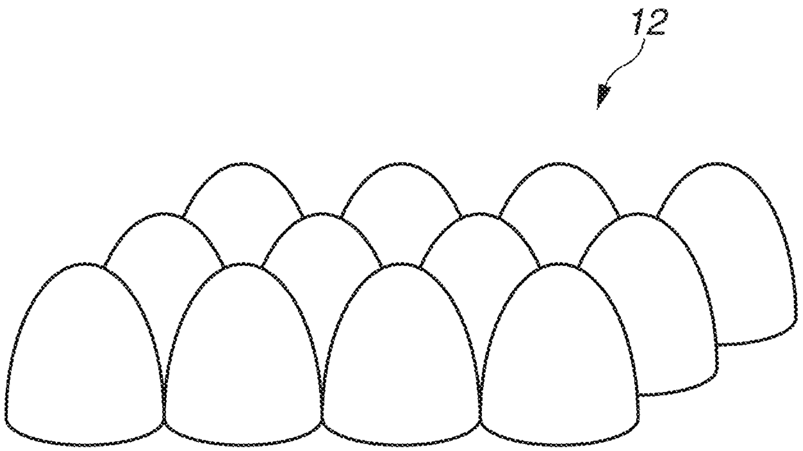
FIG. 6 is a diagram illustrating a dome-shaped uneven structure.

In Example 1, an optical element including the uneven structure 12 schematically shown in FIG. 6 was produced.

Each of the convex portions constituting the uneven structure 12 was formed in a dome shape, and the shape of each of the convex portions (the shape of the bottom surface) viewed from the normal direction was an elliptical shape. The manufactured optical element had an outer diameter of 20 millimeters (mm) and a center thickness of 5.6 mm. The thickness of the edge portion was 2 mm. The shape of the convex portion at the center of the optical surface had a length $r_1$ of 264 nm along a direction from the center of the optical surface toward the end (radial direction) and a length $r_2$ of 242 nm along a direction orthogonal to the radial direction. The ratio of the area of the bottom surface of the convex portion having the largest bottom surface area to the area of the bottom surface of the convex portion having the smallest bottom surface area, among the plurality of convex portions, was 1.0, and the ratio of the length $r_1$ to the length $r_2$ was 1.1.

The optical element of Example 1 was produced by the method described with reference to FIG. 5. The thickness of the titanium film 72 was 50 nm, and the thickness of the silica dioxide film 73 was 300 nm. The spin coating conditions were 3000 rpm in 20 seconds, and the thickness of the photoresist layer was about 200 nm. As the molding resin, cycloolefin polymer resin (COP) was used.

Figure 7:
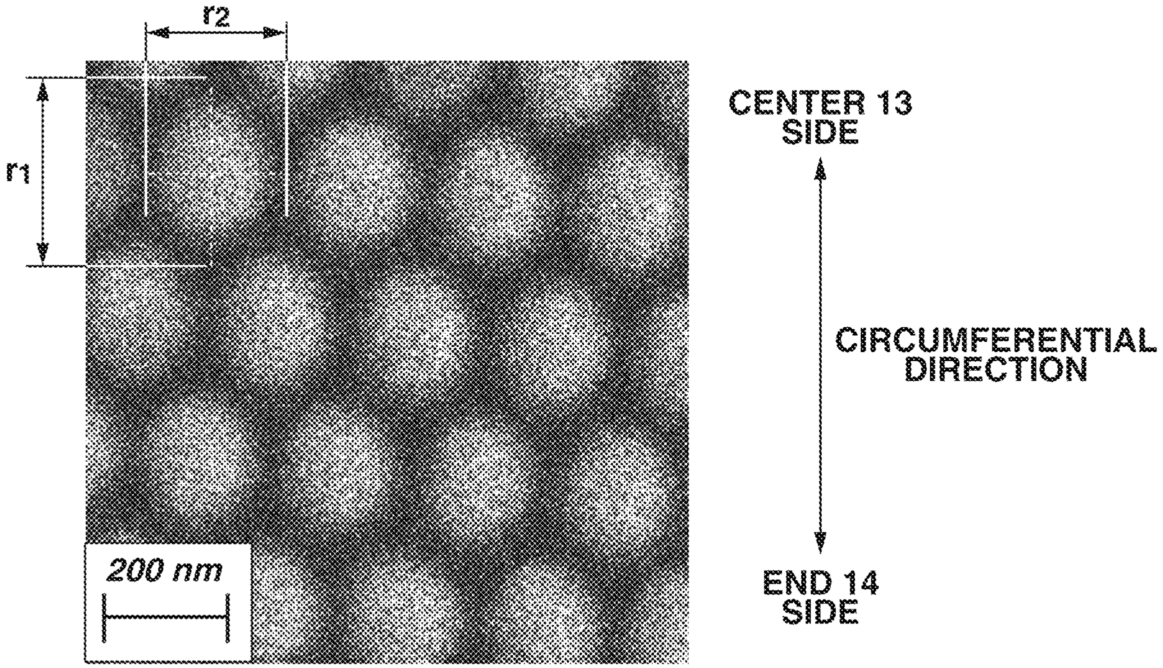
FIG. 7 is a photograph (a photograph substituted for a drawing) of an uneven structure at a position away from the center, which is observed by a scanning electron microscope (SEM) from the normal direction of the optical surface.

FIG. 7 is a photograph (a photograph substituted for a figure) of the uneven structure 12 at a position away from the center 13 by 7.8 mm in this Example, which is observed by SEM from the direction of the normal line 16, which is a normal line of the optical surface 11 (see FIG. 1B). As can be seen from FIG. 7, the lengths $r_1$ and $r_2$ in Example 1 correspond to the lengths $r_1$ and $r_2$ of the shape of the first convex portion 21 described with reference to FIG. 3, and the length $r_2$ orthogonal to the length $r_1$ is shorter than the length $r_1$. The shape of the convex portion (the shape of the bottom surface) extends in a direction from the center 13 toward the end 14.

Figure 8:
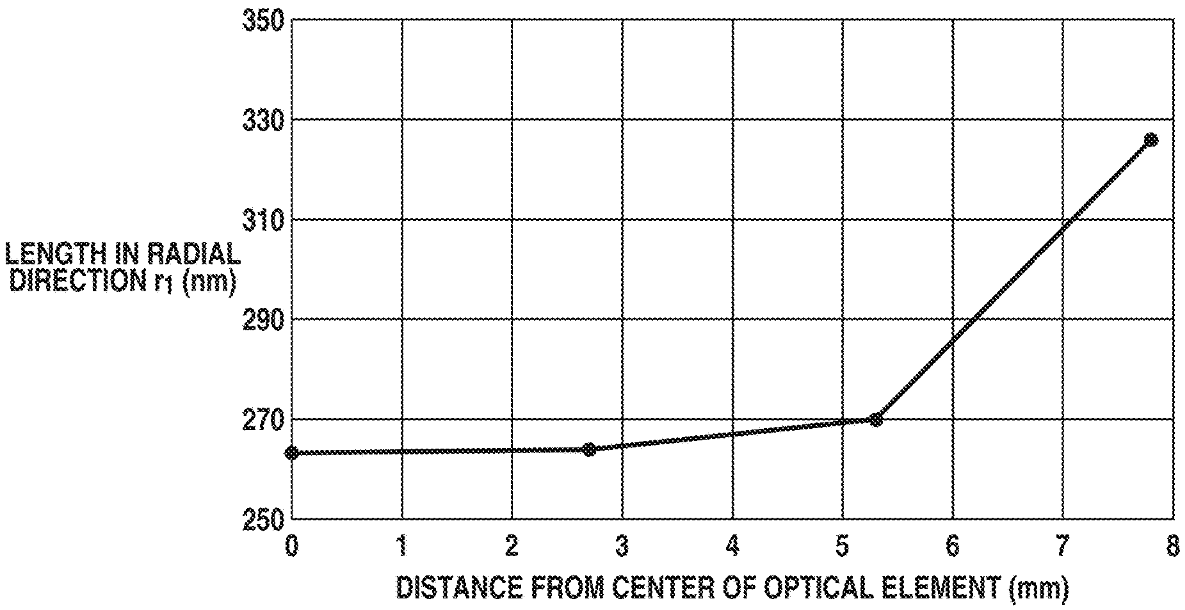
FIG. 8 is a graph illustrating a change in the radial length (nm) of each convex portion with respect to the distance (mm) from the center of the optical element.
Figure 9:
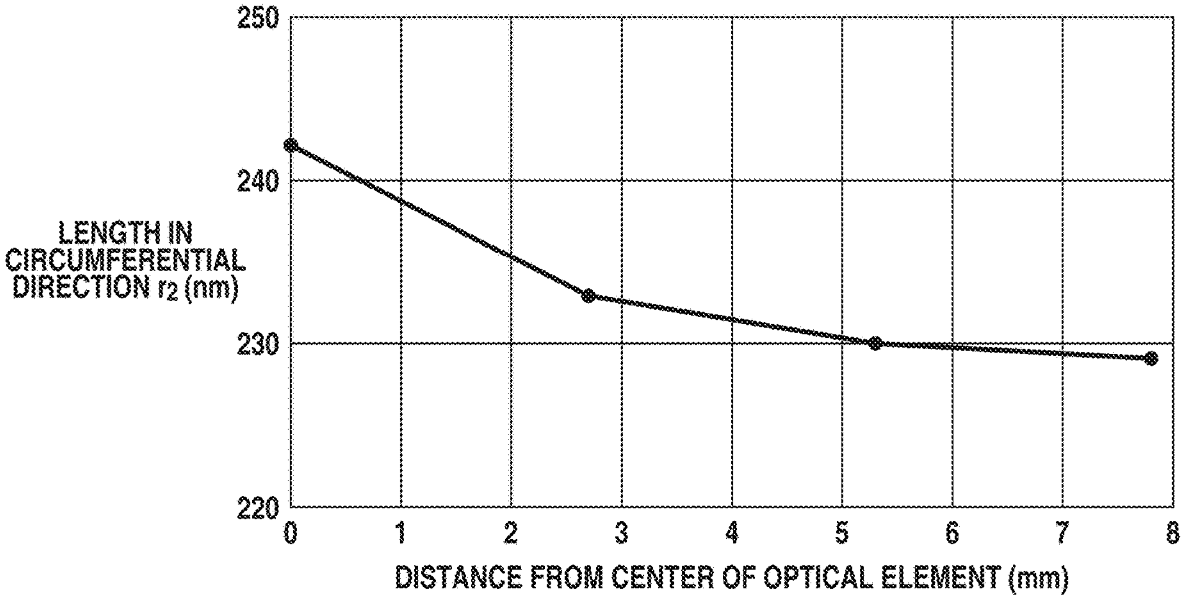
FIG. 9 is a graph illustrating a change in the circumferential length (nm) of each convex portion with respect to the distance (mm) from the center of the optical element.

FIG. 8 is a graph illustrating the variation in the length $r_1$ (nm) in the radial direction of each convex portion with respect to a distance (mm) from the center of the optical element. FIG. 9 is a graph illustrating the variation in the length $r_2$ (nm) in the circumferential direction of each convex portion with respect to the distances (mm) from the center of the optical element. As shown in FIGS. 8 and 9, the length $r_1$ becomes longer as the distance from the center 13 increases, and the length $r_2$ becomes shorter as the distance from the center 13 increases.

Figure 10:
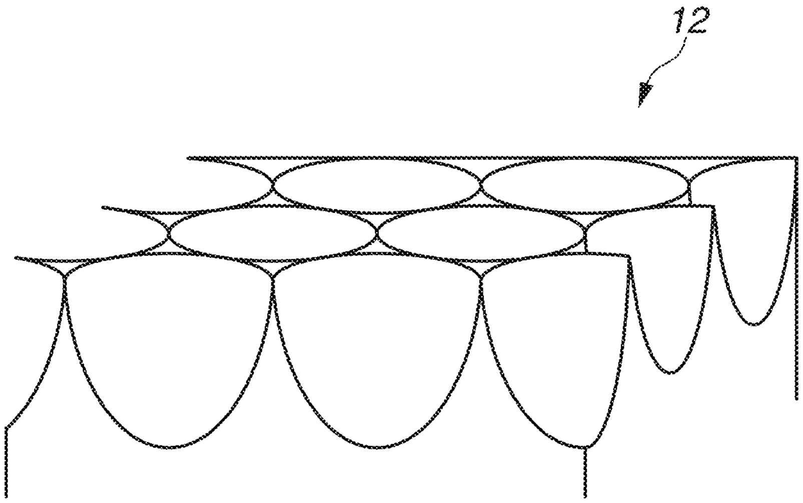
FIG. 10 is a diagram illustrating a case where a plurality of concave portions is formed on the optical surface.

In Example 1, the uneven structure 12 was formed by a plurality of convex portions, but in Example 2, as shown in FIG. 10, the uneven structure 12 was configured by forming a plurality of concave portions on the optical surface. The space formed between each concave portion and the optical surface was formed in a dome shape, and the shape (the shape of the opening) of each concave portion viewed from the normal direction of the optical surface was formed in an elliptical shape. The shape of the concave portion at the center of the optical surface was such that the length $r_1$ along the direction from the center of the optical surface toward the end (radial direction) was 360 nm, and the length $r_2$ along the direction orthogonal to the radial direction was 270 nm. The ratio of the area of the opening of the concave portion having the largest opening area to the area of the opening of the concave portion having the smallest opening area, among the plurality of concave portions, was 1.0, and the ratio of the length $r_1$ to the length $r_2$ was 1.3. As the molding resin, polycarbonate resin (PC) was used. The other conditions were the same as in Example 1.

Figure 11:
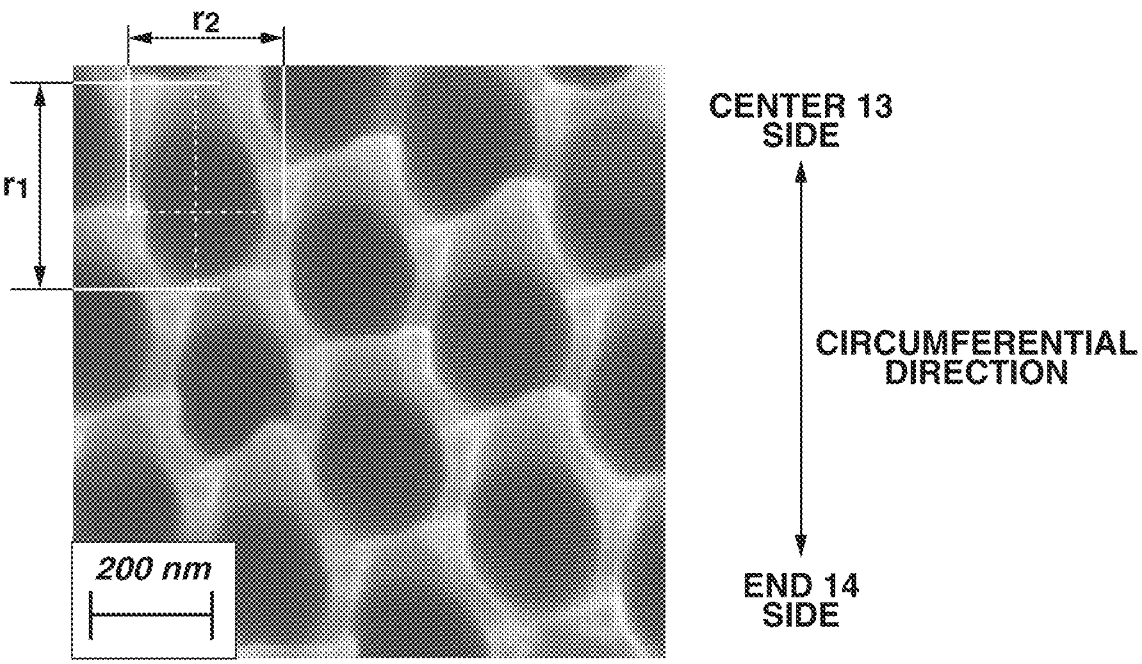
FIG. 11 is a photograph (a photograph substituted for a drawing) of the uneven structure at a position away from the center, which is observed by SEM from the normal direction of the optical surface.

FIG. 11 is a photograph (a photograph substituted for a figure) of the uneven structure 12 at a position away from the center 13 by 7.8 mm in this Example, which is observed by SEM from the normal direction of the optical surface 11. As can be seen from FIG. 11, the lengths $r_1$ and $r_2$ in Example 2 correspond to the lengths $r_1$ and $r_2$ of the opening of the concave portion, and the length $r_2$ orthogonal to the length $r_1$ is shorter than the length $r_1$. The shape of the concave portion (the shape of the opening) extends in a direction from the center 13 toward the end 14.

In Example 3, the uneven structure was provided by forming a plurality of concave portions on the optical surface, and the shape (opening shape) of the concave portion at the center of the optical surface had the length $r_1$ of 380 nm along the direction (radial direction) from the center of the optical surface toward the end and the length $r_2$ of 270 nm along the direction orthogonal to the radial direction. The ratio of the area of the opening of the concave portion having the largest opening area to the area of the opening of the concave portion having the smallest opening area was 1.4, and the ratio of the length $r_1$ to the length $r_2$ was 1.4. The optical element was produced under the same conditions as in Example 2 except that the optical element had such an uneven structure.

Comparative Example 1

In Comparative Example 1, the uneven structure was provided by forming a plurality of concave portions on the optical surface. The shape (opening shape) of each concave portion constituting the uneven structure was a circle in which the length $r_1$ along the direction from the center of the optical surface toward the end (radial direction) was 270 nm and the length $r_2$ in the direction orthogonal to the radial direction was 270 nm. The shape of the concave portion was not changed from the center to the end of the optical surface, and was the same shape. The ratio of the area of the opening of the concave portion having the largest opening area to the area of the opening of the concave portion having the smallest opening area was 1.0, and the ratio of the length $r_1$ to the length $r_2$ was 1.0. The optical element was produced under the same conditions as in Example 2 except that the optical element had such an uneven structure.

Evaluation Result

Table 1 shows the shapes of the uneven structures and the measurement results of the optical characteristics in Examples 1 to 3 and Comparative Example. In Examples 1 to 3, the average reflectance for light of wavelengths 400 nm to 780 nm at an incident angle of 30° Could be suppressed, but in Comparative Example, the average reflectance was high.

TABLE 1

| | Shape of Uneven structure | | | | Optical Characteristics | |
|---|---|---|---|---|---|---|
| | Smallest $r_1$ | Largest $r_2$ | Area ratio | $r_1/r_2$ | Average reflectance (incident angle 30°) | Average reflectance incident from normal direction) |
| Example 1 | 264 nm | 242 nm | 1.0 | 1.1 | 0.27% | 0.19% |
| Example 2 | 360 nm | 270 nm | 1.3 | 1.3 | 0.27% | 0.17% |
| Example 3 | 380 nm | 270 nm | 1.4 | 1.4 | 0.17% | 0.34% |
| Comparative Example 1 | 270 nm | 270 nm | 1.0 | 1.0 | 0.31% | 0.18% |

Next, in a second exemplary embodiment, an imaging apparatus 600 will be described as an example of an optical apparatus to which the optical element 10 described in the first exemplary embodiment and Examples can be applied, with reference to FIG. 13.

Figure 13:
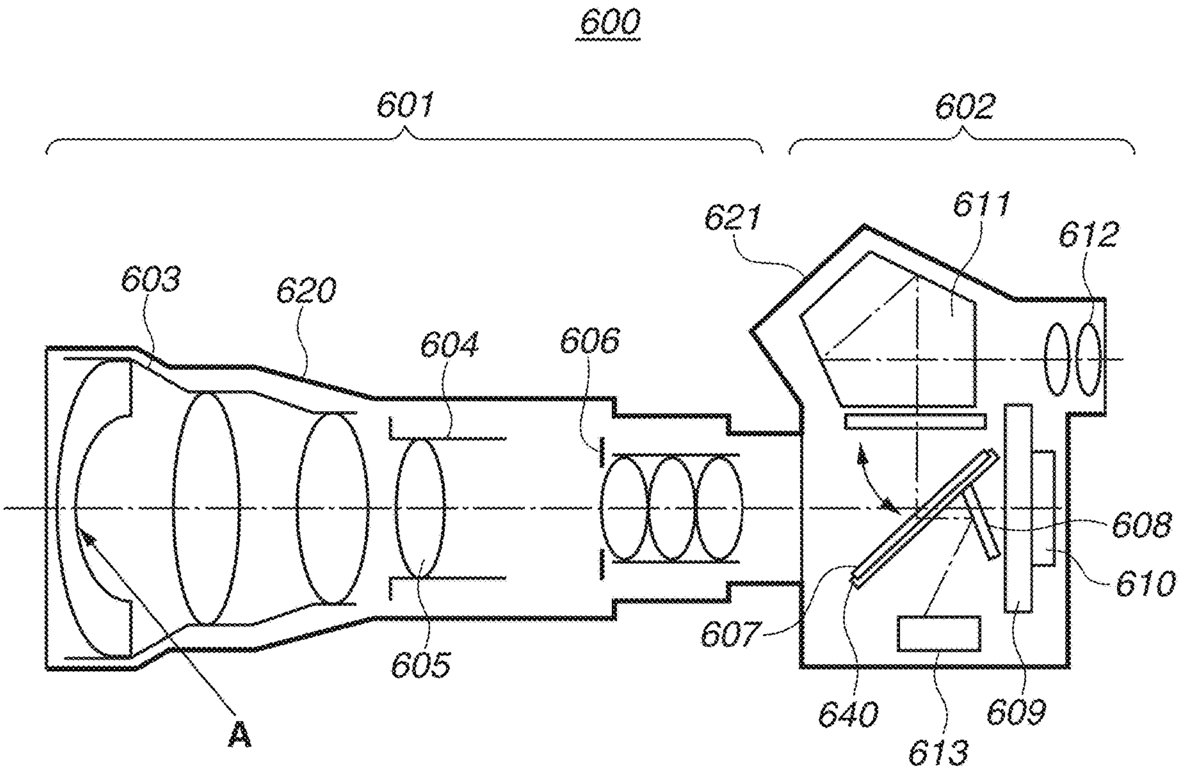
FIG. 13 is a schematic cross-sectional view of a camera module as an imaging device.

FIG. 13 is a schematic cross-sectional view of a camera module as the imaging apparatus 600. The camera module includes a camera body 602 and a lens barrel 601 as an optical device. Although FIG. 13 shows a state where these members are coupled, it is preferable that the lens barrel 601 is an interchangeable lens that is attachable to and detachable from the camera body 602.

Light from a subject passes through the imaging optical system in a housing 620 of the lens barrel 601 and is received by an imaging element 610. The imaging optical system includes a plurality of lenses 603 and 605, and the like, which are arranged on the optical axis. The light received by the imaging element 610 is light in the visible light region (wavelengths: 300 nm or more and 800 nm or less). The optical element 10 (see FIG. 1A) according to the present exemplary embodiment can be used for the lens 605, for example, and can also be used for a lens other than the lens 605. For example, the uneven structure 12 (see FIG. 1A) can be provided on the optical surface of the lens 603 indicated by the arrow A, and thus, the ghost can be reduced to a level at which the ghost does not affect the image.

Here, the lens 605 is supported by an inner cylinder 604 in the housing, and is movable in the optical axis direction with respect to an outer cylinder of the lens barrel 601 for focusing and zooming.

The size of the lens 605 is preferably 40 mm or more and 60 mm or less in diameter.

In an observation period before imaging, light from a subject is reflected by a main mirror 607 in a housing 621 of a camera body. The reflected light passes through a prism 611 and then through a finder lens 612, and a captured image is displayed to the user. The main mirror 607 is, for example, a half mirror, and light transmitted through the main mirror is reflected by a sub mirror 608 toward an autofocus (AF) unit 613. The reflected light is used for measuring the distance to the subject, for example. The main mirror 607 is mounted on and supported by a main mirror holder 640 by adhesion or the like. At the time of image capturing, the main mirror 607 and the sub mirror 608 are moved out of the optical path by a driving mechanism (not shown), and a shutter 609 is opened to form a captured optical image incident from the lens barrel 601 on the imaging element 610. A diaphragm 606 is configured to change the brightness and the depth of focus at the time of imaging by changing the opening area.

The optical apparatus of the present disclosure is not limited to the imaging apparatus 600, and refers to electronic apparatuses such as binoculars, microscopes, semiconductor exposure apparatuses, interchangeable lenses, and cameras, and particularly, apparatuses including an optical system having an optical element. Alternatively, the optical apparatus refers to an apparatus that generates an image by light that has passed through the optical element 10 (see FIG. 1A). The optical element according to the present disclosure may be used in a camera system such as a digital still camera or a digital video camera, or an electronic apparatus including an imaging element that receives light passing through the optical element of the present disclosure, such as a mobile phone. The lens can also be applied to various lenses such as an image forming lens of an electrophotographic printer, a lens of a microscope, glasses, and a contact lens.

The exemplary embodiments described above can be appropriately modified without departing from the technical idea. For example, a plurality of exemplary embodiments can be combined. In addition, some of the matters of at least one exemplary embodiment may be deleted or replaced. Furthermore, new matters can be added to at least one exemplary embodiment.

The disclosure of the present specification includes not only what is explicitly described in the present specification but also all matters that can be understood from the present specification and the drawings attached to the present specification. The disclosure also includes the complement of any individual concept described herein. That is, for example, when the description "A is greater than B" is present in the present specification, even if the description "A is not greater than B" is omitted, the present specification can be said to disclose that "A is not greater than B". This is because, when "A is greater than B" is described, it is assumed that the case where "A is not greater than B" is considered.

According to the present disclosure, it is possible to suppress variation in antireflection performance on an optical surface of an optical element.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-028687, filed Feb. 27, 2023, which is hereby incorporated by reference herein in its entirety.

What is claimed is:

1. An optical element comprising:

an optical surface having an optical center; and an uneven structure including a plurality of convex portions on at least part of the optical surface, wherein the plurality of convex portions includes a first convex portion and a second convex portion arranged closer to the optical center than the first convex portion, wherein an outer edge of the optical surface is circular, wherein the optical surface is provided with a first group of convex portions including the first convex portion and a second group of convex portions including the second convex portion, the first group and the second group being arranged concentrically with respect to the optical center of the optical surface, wherein a shape of the first convex portion as viewed from a normal direction of the first convex portion has a length $r_1$ in a radial direction from the optical center of the optical surface toward an end of the optical surface and a length $r_2$ in a circumferential direction intersecting the radial direction, wherein a shape of the second convex portion as viewed from a normal direction of the second convex portion has a length $r_3$ in a radial direction from the optical center of the optical surface toward the end of the optical surface and a length $r_4$ in a circumferential direction intersecting the radial direction, and wherein the following relationships are satisfied:

$r_1>r_2$, $r_3\geq r_4$, $r_1>r_3$, and $r_2<r_4$.

2. The optical element according to claim 1, wherein the plurality of convex portions include a concave portion corresponding to a portion between each two adjacent convex portions to form a plurality of concave portions included with the uneven structure, wherein the plurality of concave portions includes a first concave portion and a second concave portion arranged closer to the optical center of the optical surface than the first concave portion, wherein a shape of the first concave portion as viewed from a normal direction of the first concave portion has the length $r_1$ in the radial direction from the optical center of the optical surface toward the end of the optical surface and the length $r_2$ in the circumferential direction intersecting the radial direction, wherein a shape of the second concave portion as viewed from a normal direction of the second concave portion has the length $r_3$ in the radial direction from the optical center of the optical surface toward the end of the optical surface and the length $r_4$ in a circumferential direction intersecting the radial direction, and wherein the following relationships are satisfied:

$r_1>r_2$, $r_3\geq r_4$, $r_1>r_3$, and $r_2<r_4$.

3. The optical element according to claim 1, wherein a distance between adjacent convex portions among the plurality of convex portions is shorter than a wavelength of light incident on the optical surface.

4. The optical element according to claim 1, wherein an area of a bottom surface of a convex portion having a largest area among areas of bottom surfaces of the plurality of convex portions is 1.0 times or more and 1.4 times or less an area of a bottom surface of a convex portion having a smallest area among the areas of the bottom surfaces of the plurality of convex portions.

5. The optical element according to claim 1, wherein the length $r_1$ is longer than 1.0 times the length $r_2$ and 1.4 times or less the length $r_2$.

6. The optical element according to claim 1, wherein a shape of the first convex portion as viewed from a normal direction of the optical surface is an elliptical shape.

7. The optical element according to claim 1, wherein the plurality of convex portions is arranged in a staggered manner.

8. The optical element according to claim 1, wherein the length $r_1$ is equal to or less than 380 nanometers (nm).

9. The optical element according to claim 1, wherein the optical element is made of a material containing a resin.

10. The optical element according to claim 9, wherein the resin is (i) one resin selected from a group consisting of cycloolefin polymer resin, polycarbonate resin, polystyrene resin, and acrylic resin, or is (ii) a mixture of two or more resins selected from the group consisting of cycloolefin polymer resin, polycarbonate resin, polystyrene resin, and acrylic resin.

11. The optical element according to claim 1, wherein the optical surface includes a curved surface.

12. The optical element according to claim 1, wherein the optical element is a lens.

13. An optical apparatus comprising:

the optical element according to claim 1, wherein the optical element is a lens; and a lens barrel that houses the optical element.

14. An optical apparatus comprising:

the optical element according to claim 1, wherein the optical apparatus is a camera; and a lens barrel that houses the optical element.

15. A method for manufacturing the optical element according to claim 1, comprising:

forming a cavity with a mold having a surface on which an uneven structure corresponding to the uneven structure is formed; and injecting a resin into the cavity to mold the optical element.

16. An optical element comprising:

an optical surface having an optical center; and an uneven structure including a plurality of concave portions on at least part of the optical surface, wherein the plurality of concave portions includes a first concave portion and a second concave portion arranged closer to the optical center than the first concave portion, wherein an outer edge of the optical surface is circular, wherein the optical surface is provided with a first group of concave portions including the first concave portion and a second group of concave portions including the second concave portion, the first group and the second group being arranged concentrically with respect to the optical center of the optical surface, wherein a shape of the first concave portion as viewed from a normal direction of the first concave portion has a length $r_1$ in a radial direction from the optical center of the optical surface toward an end of the optical surface and a length $r_2$ in a circumferential direction intersecting the radial direction, wherein a shape of the second concave portion as viewed from a normal direction of the second concave portion has a length $r_3$ in a radial direction from the optical center of the optical surface toward the end of the optical surface and a length $r_4$ in a circumferential direction intersecting the radial direction, and wherein the following relationships are satisfied:

$r_1>r_2$, $r_3\geq r_4$, $r_1>r_3$, and $r_2<r_4$.

* * * * *